Figure 1A:
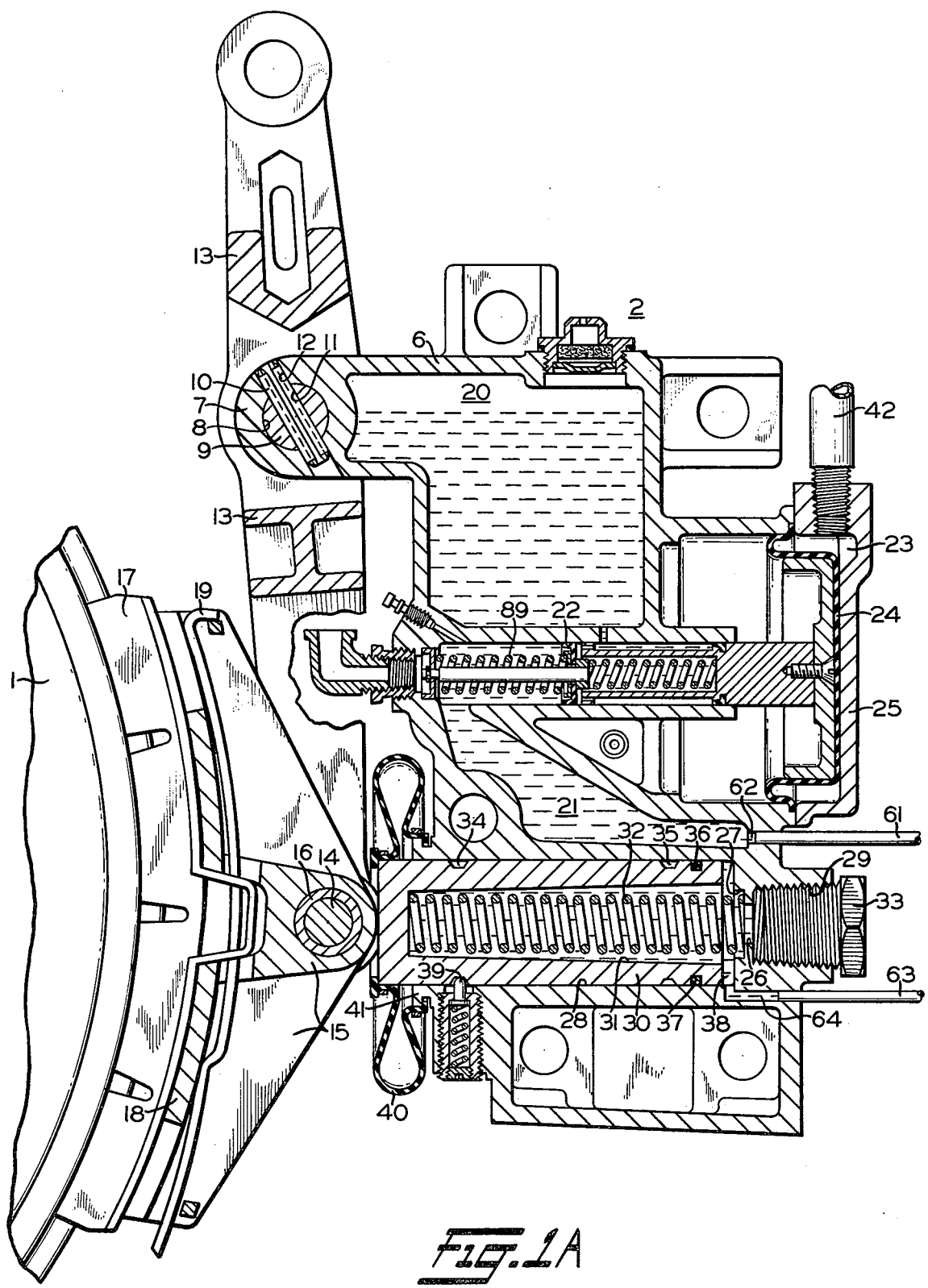

United States Patent [19]
Cannon

[11] 3,985,397
[45] Oct. 12, 1976

[54] WHEEL SLIP CONTROL OF HYDRO-PNEUMATIC BRAKE APPARATUS

[75] Inventor: John G. Cannon, Penn Hills, Pa.

[73] Assignee: Westinghouse Air Brake Company, Wilmerding, Pa.

[22] Filed: Oct. 31, 1975

[21] Appl. No.: 627,534

[52] U.S. Cl. .......................... 303/21 F; 188/181 A; 303/21 R
[51] Int. Cl.² ........................................... B60T 8/04
[58] Field of Search ........ 188/181 A, 181 C, 181 R; 303/21 R, 21 F, 21 CF, 21 CG

[56] References Cited
UNITED STATES PATENTS

| | | | |
|---|---|---|---|
| 2,198,032 | 4/1940 | Farmer | 303/21 CF |
| 2,317,133 | 4/1943 | Hines et al. | 303/21 R |
| 3,004,800 | 10/1961 | Edmund | 303/21 R |
| 3,517,784 | 6/1970 | Clemmons | 188/196 A |

*Primary Examiner*—Duane A. Reger
*Attorney, Agent, or Firm*—W. F. Poore; R. W. McIntire, Jr.

[57] ABSTRACT

When the deceleration of a vehicle wheel exceeds a certain chosen value, a wheel-slip-responsive means causes operation of a valve to close communication between a hydraulic master cylinder and a hydraulic brake-applying cylinder and connect this brake applying cylinder to a volume chamber to thereby release the braking force on the wheel until this wheel accelerates back to an angular velocity that corresponds to the linear velocity of the vehicle.

19 Claims, 4 Drawing Figures

WHEEL SLIP CONTROL OF HYDRO-PNEUMATIC BRAKE APPARATUS

BACKGROUND OF THE INVENTION

Mechanisms, controlled responsively to the occurrence of a slipping condition of a vehicle wheel due to excessive application of an air-operated brake, for effecting a reduction in the degree of the brake application and a subsequent increase in the degree of the brake application in a manner to prevent the sliding of the vehicle wheels have been used for many years in both the railway and automotive industries.

In recent years hydro-pneumatic brake units have been successfully used experimentally to apply a braking force to each individual wheel of rapid transit vehicles. It is, therefore, apparent that apparatus, controlled responsively to the occurrence of a slipping condition of the individual wheel due to the application of excessive braking force thereto, for effecting a reduction in the degree of this braking force and a subsequent increase in the retarding force applied to the wheel in such a manner as to prevent sliding of the wheel would be most desirable.

Accordingly, it is the general purpose of this invention to provide a brake control apparatus for a hydro-pneumatic brake unit that includes a power-actuated brake-applying-force relief valve device which is automatically operative responsive to the occurrence of a slipping condition of a vehicle wheel to cause a reduction in the degree of the hydraulic brake application effected by the brake unit and a subsequent increase in the brake application upon cessation of the slipping condition.

SUMMARY OF THE INVENTION

According to the present invention, a wheel slip control apparatus interposed in a communication extending between a hydro-pneumatic master cylinder and a hydraulic brake-applying cylinder of a brake unit for an individual wheel of a vehicle comprises a power-operated valve that is moved from a first position in which a communication between the master cylinder and the brake-applying cylinder is open to a second position in which this communication is closed and the brake-applying cylinder is connected to a volume reservoir to relieve the pressure on the hydraulic fluid acting on the piston of the brake-applying cylinder. The valve is connected to a piston that is subject on one side to the force of a spring. Upon the deceleration of the vehicle wheel at an excessive rate, a force in excess of the force of the spring is applied to the other side of the piston to cause this piston to move the valve from its first to its second position. This movement of the piston increases the volume of a chamber and thereby tends to produce a vacuum in this chamber which, by reason of a communication with the hydraulic fluid in the brake-applying cylinder, thereby releases or relieves the pressure on the brake-applying hydraulic fluid to thereby enable the vehicle wheel to accelerate back to its original angular velocity prior to a reapplication of a hydraulic braking force to the tread surface of this wheel.

Figure 1B:
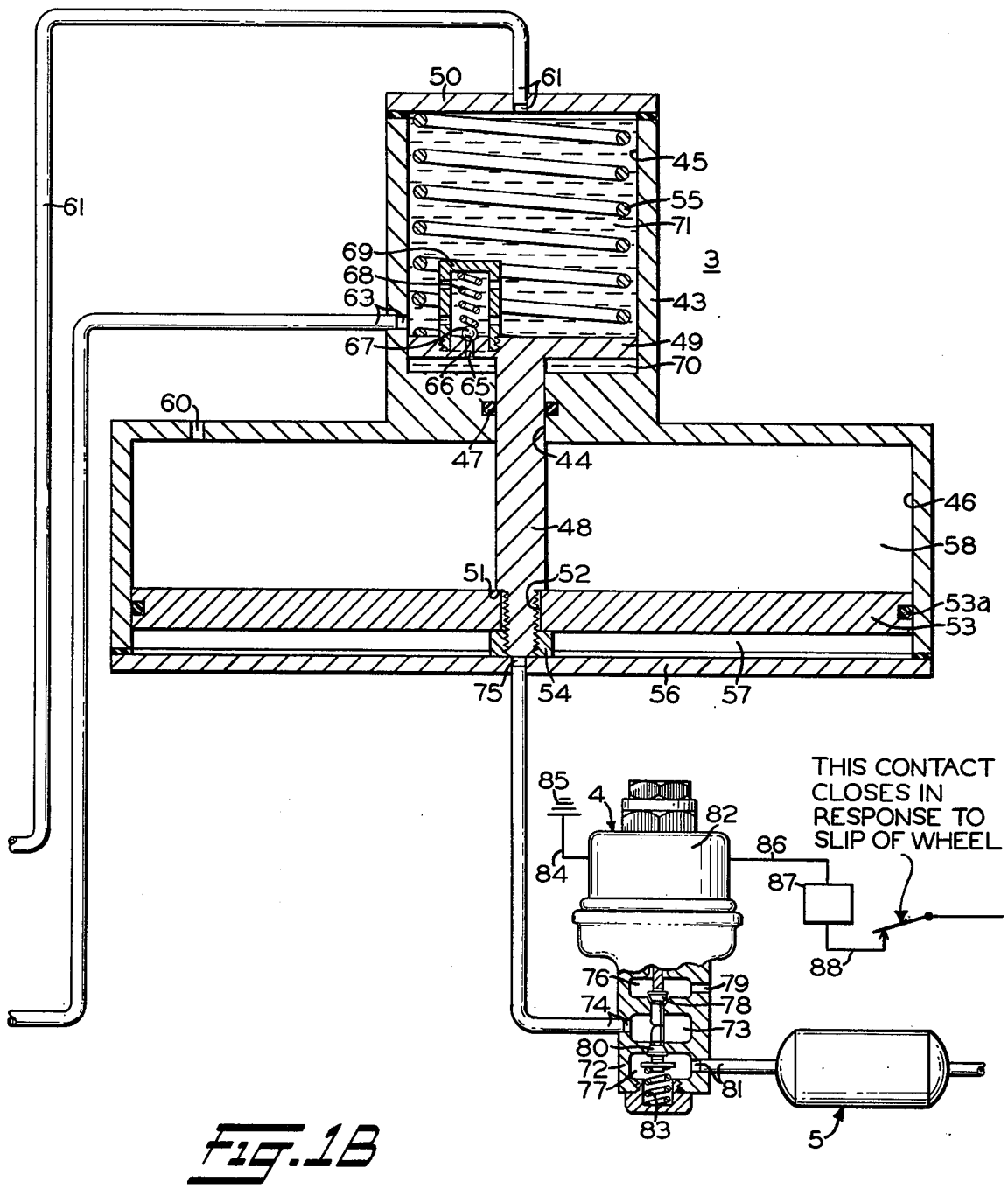

In the accompanying drawings:

FIG. 1A and FIG. 1B, when taken together such that the right-hand edge of FIG. 1A is matched with the left-hand edge of FIG. 1B, show a diagrammatic cross-sectional view of a single wheel hydro-pneumatic brake apparaus constituting a first embodiment of the invention.

Figure 2:
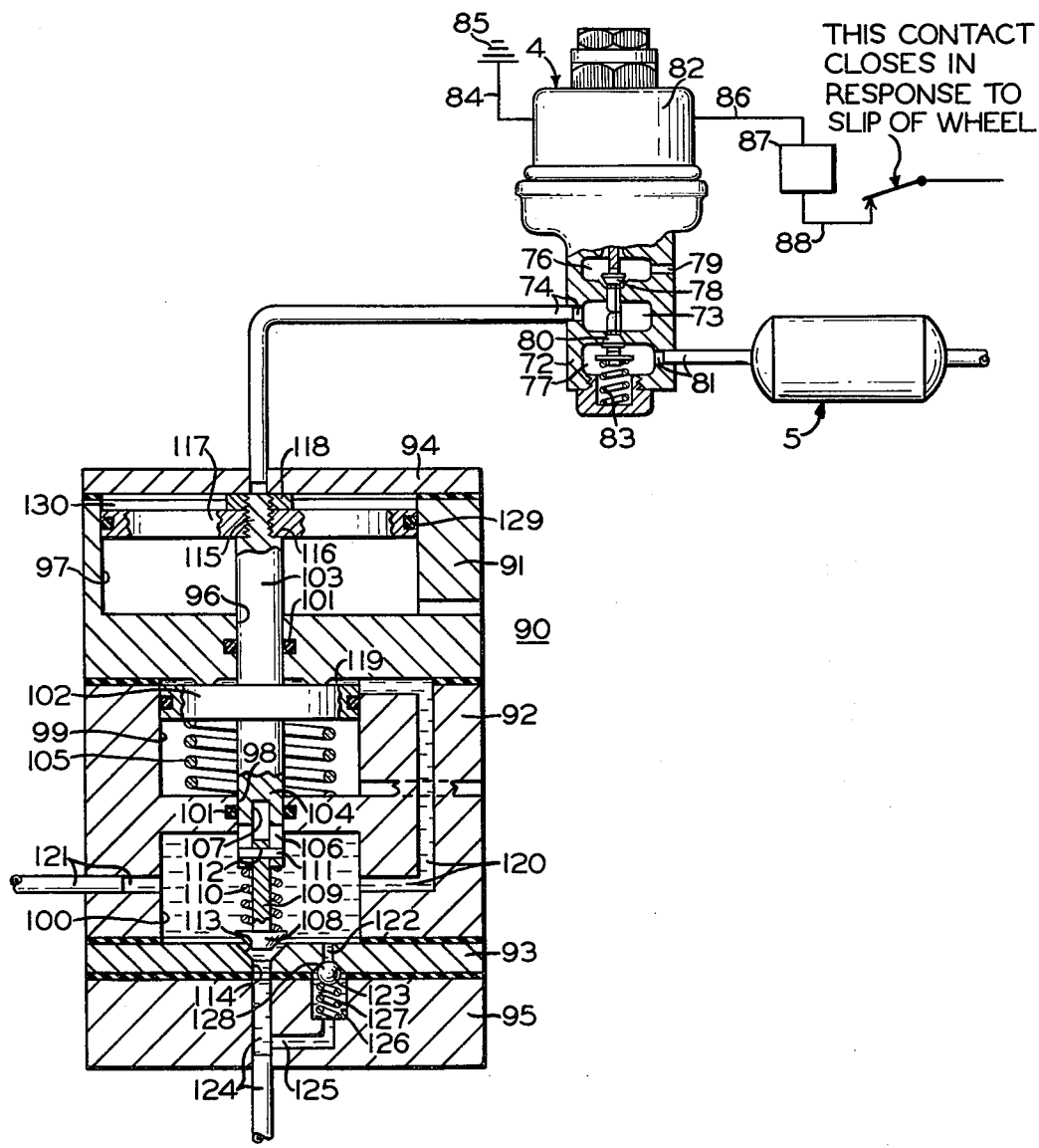

FIG. 1A and FIG. 2, when taken together such that the right-hand edge of FIG. 1A is matched with the left-hand edge of FIG. 2, show a diagrammatic cross-sectional view of a single wheel hydro-pneumatic brake apparatus constituting a second embodiment of the invention.

Figure 3:
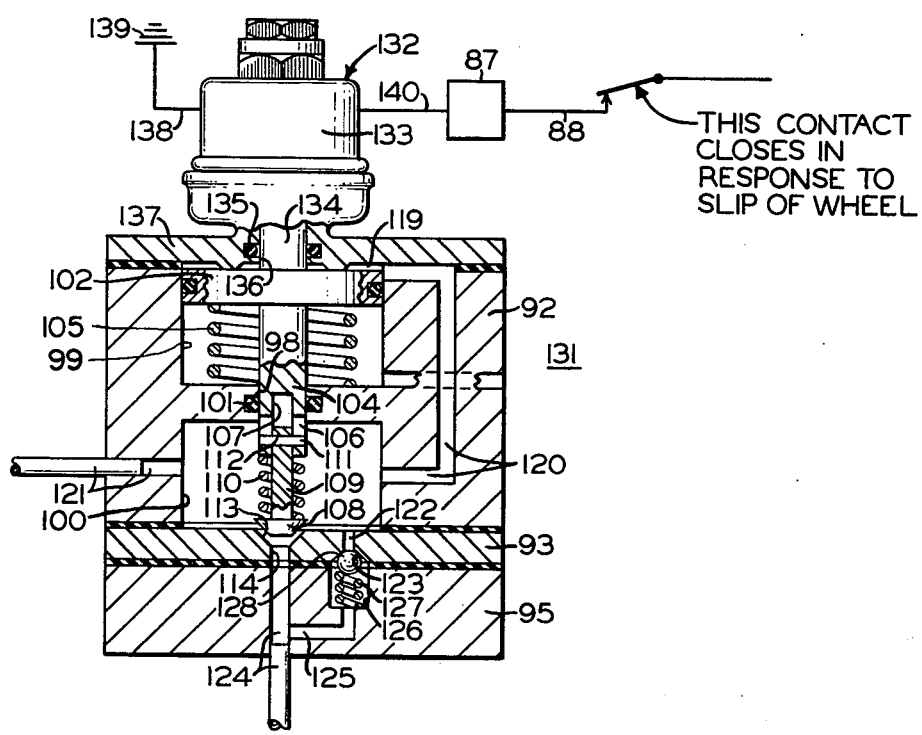

FIG. 1A and FIG. 3, when taken together such that the right-hand edge of FIG. 1A is matched with the left-hand edge of FIG. 3, show a diagrammatic cross-sectional view of a single wheel hydro-pneumatic brake apparatus constituting a third embodiment of the invention.

DESCRIPTION — FIGS. 1A AND 1B

Referring to FIGS. 1A and 1B of the drawings, the apparatus for controlling wheel slip of a vehicle wheel 1 that is braked by a hydro-pneumatic brake unit 2 comprises a pneumatically-operated hydraulic relief valve device 3 through which a hydraulic fluid under pressure is supplied to cause the application of a brake-applying force to the tread surface of the wheel 1 and a magnet valve device 4, which is operatively responsive to a slipping condition of the wheel 1, to effect the supply of pneumatic fluid under pressure from a storage reservoir 5 on the vehicle to the pneumatically-operated hydraulic relief valve device 3 to cause the operation thereof to reduce the degree of the brake applying force acting on the wheel 1.

As shown in FIG. 1A of the drawings, the hydro-pneumatic brake unit 2 comprises a casing 6 that has formed integral therewith a boss 7 which is provided with a bore 8 that extends therethrough. A fulcrum pin 9, the length of which exceeds the length of the bore 8, extends through this bore 8 and is secured to the boss 7 by a roll pin 10 that is disposed in a bore 11 in the fulcrum pin 9 and a coaxial bore 12 in the boss 7.

The two portions of the fulcrum pin 9 that extend from the opposite sides of the boss 7 enable a bifurcated type of combined hand brake lever and hanger 13 to be rockably mounted intermediate its ends on this fulcrum pin 9.

As shown in FIG. 1A, the combined hand brake lever and hanger 13 carries adjacent its lower end a pin 14 on which is pivotally mounted a brake head 15 there being a wear bushing 16 interposed between the pin 14 and the brake head 15.

A brake shoe 17 for applying a braking force to the tread surface of the wheel 1 is molded to a backing plate 18 that enables this brake shoe 17 to be secured to the brake head 15 by a conventional brake shoe key 19.

As further shown in FIG. 1A, formed in the casing 6 is a hydraulic fluid storage reservoir 20 and a chamber 21 to which hydraulic fluid under pressure may be supplied from the hydraulic fluid storage reservoir 20 by a packing cup 22 when moved in the direction of the left hand, as viewed in FIG. 1A, in response to the supply of pneumatic fluid under pressure to a chamber 23 formed by the cooperative relationship of a flexible diaphragm 24 and a pressure head 25 that is secured to the casing 6 by any suitable means (not shown), it being noted that the outer periphery of the diaphragm 24 is clamped between the casing 6 and the pressure head 25.

The diaphragm 24 is connected to the packing cup 22 by a plunger and valve mechanism that may be the same in construction and operation as that shown in U.S. Pat. No. 3,517,784 issued June 30, 1970, to Quentin T. Clemmons and assigned to the assignee of the present application. Therefore, reference may be had to U.S. Pat. No. 3,517,784 for this construction so that a detailed description thereof is not deemed necessary herein.

As may be seen from FIG. 1A of the drawings, the casing 6 is provided with a bore 26 and three coaxial counterbores 27, 28 and 29. The counterbore 28 constitutes a hydraulic cylinder for a hydraulic brake-applying piston 30 that is slidably mounted therein. This piston 30 is provided with a longitudinal bottomed bore 31. A spring 32 disposed in the bottomed bore 31 and interposed between the left-hand end of this bottomed bore and the right-hand end of the counterbore 27 constitutes a "snow brake" in the manner described in the above-mentioned U.S. Pat. No. 3,517,784.

The above-mentioned counterbore 29 is provided with internal screw threads for receiving an externally-threaded plug 33 which closes the right-hand end of this counterbore 29.

As shown in FIG. 1A, the piston 30 at its left-hand end abuts the brake head 15 and is provided intermediate its ends with three spaced-apart peripheral annular grooves 34, 35 and 36. The groove 36 is located adjacent the right-hand end of the piston 30 and carries therein an O-ring seal 37 that forms a seal with the wall surface of the counterbore 28 to inhibit leakage of hydraulic fluid under pressure from a chamber 38 formed by the cooperative relationship of the piston 30 and the casing 6 and into which opens the bottomed bore 31 in this piston 30. The groove 35 is adjacent the groove 36 and the groove 34 is adjacent the left-hand end of the piston 30 so as to receive therein a spring-loaded detent or plunger 39 while the piston 30 occupies the position shown in FIG. 1A. This detent 39 serves to hold the piston 30 in the position in which it is shown when the brake shoe key 19 is removed and a worn brake shoe 17 replaced with a new shoe.

If the combined brake lever and hanger 13 becomes damaged so that it must be removed from the brake unit 2 and replaced, the spring 32 will force the piston 30 outward until the plunger 39 is forced into the groove 35 thus preventing this spring 32 from pushing the piston 30 completely out of the brake unit 2 when the hanger 13 and brake head 15 are moved away from this brake unit.

In order to prevent the entrance of water, ice and dirt into the interior of the counterbore 28, a rubber boot 40 surrounds the left-hand end of the piston 30 exterior of the casing 6. The opposite inturned ends of the boot 40 are provided with beads which fit, respectively around the left-hand end of the piston 30 and in a groove formed in a boss 41 disposed on the left-hand vertical face of the casing 6.

Pneumatic or hydraulic fluid under pressure may be supplied to the chamber 23 via a passageway and correspondingly numbered pipe 42 that may be connected to such as the brake cylinder port of the usual brake control valve device (not shown) of the air brake equipment on vehicles under the control of the operator.

As shown in FIG. 1B of the drawings, the pneumatically-operated hydraulic relief valve device 3 comprises a reversed double-cupped casing 43 that is provided with a bore 44 that at its upper end opens into a coaxial counterbore 45 and at its lower end opens into a coaxial counterbore 46 of larger diameter. The wall surface of the bore 44 is provided with a groove in which is inserted an O-ring seal 47 through which extends a piston rod 48 the upper end of which is integral with a piston 49 which constitutes a piston valve that is disposed with a sliding fit in the counterbore 45. The upper end of the counterbore 45 is closed by a pressure head 50 that is secured to the casing 43 by any suitable means (not shown).

Adjacent its lower end, the piston rod 48 is provided with a shoulder 51 and an externally screw-threaded portion that extends through a smooth bore 52 provided in a piston 53 of large diameter that is slidably disposed in the large diameter counterbore 46. A nut 54, that has screw-threaded engagement with the external screw-threaded portion of the piston rod 48, forces the piston 53 against the shoulder 51 on this piston rod 48 thereby providing a rigid connection between the pistons 49 and 53.

A spring 55 disposed in the counterbore 45 and interposed between the pressure head 50 and the piston valve 49 is normally effective to bias this piston valve 49, the piston 53 and the piston rod 48 to the position shown in FIG. 1B in which the nut 54 abuts a second pressure head 56 that is secured to the lower end of the casing 43 by any suitable means (not shown). This pressure head 56 cooperates with the wall surface of the counterbore 46 and the piston 53 to form a chamber 57 below this piston 53 the periphery of which is provided with an annular groove in which is disposed an O-ring seal 53a. This O-ring seal 53a forms a seal with the wall surface of the counterbore 46 to prevent leakage of fluid under pressure from the chamber 57 below the piston 53 to a chamber 58 above this piston which chamber 58 is constantly open to atmosphere via a short passageway 60 provided in the casing 43.

As shown in FIG. 1B, opening into the upper end of the counterbore 45 is one end of a passageway 61 that extends through the pressure head 50 and is connected by a correspondingly numbered pipe to one end of a short passaeway 62 (FIG. 1A) provided in the casing 6. The opposite of this passageway 62 opens into the hereinbefore-mentioned chamber 21 formed in the casing 6.

In the absence of fluid under pressure in the chamber 57 (FIG. 1B), the spring 55 is effective to bias the piston valve 49 and piston 53 to the position shown in which the piston valve 49 is disposed below the location at which one end of a passageway 63 opens at the wall surface of the counterbore 45. This passageway 63 extends through the casing 43 and is connected by a correspondingly numbered pipe to one end of a passageway 64 (FIG. 1A) in the casing 43. The opposite end of this passageway 64 opens into the hereinbefore-mentioned chamber 38.

As shown in FIG. 1B, extending through the piston valve 49 is a passageway 65 that has a valve seat 66 formed at the upper end thereof. A ball-type valve 67 is normally biased into seating contact with the valve seat 66 by a spring 68 that is interposed between this valve 67 and a cup-shaped perforated spring seat 69 the lower end of which is provided with external screw threads that have screw-threaded engagement with internal screw threads provided therefor in a bottomed bore extending inward from the upper side of the piston 49. The ball valve 67 provides for one-way flow of hydraulic fluid from a chamber 70 below the piston 49 to a chamber 71 above this piston in a manner hereinafter explained.

The magnet valve device 4 is operative to effect the supply of fluid under pressure from the reservoir 5 to the chamber 57 to cause upward movement of the piston 53 and piston valve 49 from the position shown. This magnet valve device 4 comprises a casing or body 72 that has therein a first chamber 73 into which opens one end of a passageway 74 that is connected by a correspondingly numbered pipe to a short passageway 75 that extends through the pressure head 56 and opens into the chamber 57 below the piston 53.

The body 72 of the magnet valve device 4 is provided with a second chamber 76 disposed above the first chamber 73 and a third chamber 77 disposd below the chamber 73. Disposed in the second chamber 76 is a poppet valve 78 arranged to control communication between chamber 73 and chamber 76 which is open to atmosphere via a short passageway 79 in the body 72. Disposed in the third chamber 77 is a poppet valve 80 arranged to control communication from this chamber 77, which is connected to the reservoir 5 by a passageway and pipe 81, to the first chamber 73.

The magnet valve device 4 further comprises a solenoid 82 operative upon energization to close the valve 78 and open the valve 80 against the yielding resistance of a spring 83 disposed in the chamber 77. This spring 83 is effective to close the valve 80 and open the valve 78 upon deenergization of the solenoid 82.

The solenoid 82 comprises a coil one end of which is connected by a wire 84 to ground indicated by the reference numeral 85. The other end of the coil of the solenoid 82 is connected by a wire 86 to a brake relay driver amplifier 87. This brake relay driver amplifier 87 in turn is connected by a wire 88 to one terminal of a switch armature of a relay in any suitable device that is operatively responsive to a chosen rate of deceleration of the wheel 1 of the vehicle. This switch armature may be, for example, the switch armature 22 of the relay 17 shown in FIG. 1 of the drawings in U.S. Pat. No. 3,912,034 issued Oct. 14, 1975, to Julius Pallof and assigned to the assignee of the present application.

It will be understood that the storage reservoir 5 on the vehicle may be charged with pneumatic fluid under pressure in any suitable manner.

OPERATION — FIG. 1A AND FIG. 1B

Assume that the brake apparatus shown in FIG. 1A and FIG. 1B, when the right-hand edge of FIG. 1A is matched with the left-hand edge of FIG. 1B, is the apparatus on a vehicle to control the braking of the wheel 1 shown in FIG. 1A.

In operation, when it is desired to effect a brake application on the wheel 1, pneumatic fluid under pressure is admitted to the pressure chamber 23 (FIG. 1A) through the passageway and pipe 42 which is connected to the brake control valve device of the usual air brake equipment on the vehicle. Pneumatic fluid under pressure thus supplied to the chamber 23 formed between the diaphragm 24 and the pressure head 25 is effective to deflect the diaphragm 24 in the direction of the left hand, as viewed in FIG. 1A. This deflection of the diaphragm 24 in the direction of the left hand is effective, in the manner explained in detail in the hereinbefore-mentioned U.S. Pat. No. 3,517,784, to move the packing cup 22 in the direction of the left hand.

This movement of the packing cup 22 will cause an increase in the pressure of the hydraulic fluid in the chamber 21.

It is well-known that a hydraulic fluid or liquid is substantially incompressible. Therefore, assuming that the chamber 21 (FIG. 1A), passageway 62, pipe and passageway 61 (FIG. 1B), chamber 71, passageway and pipe 63, passageway 64 (FIG. 1A) and chamber 38 have been completely filled with a suitable hydraulic fluid from the storage reservoir 20, it will be apparent that the pressure of the incompressible hydraulic fluid in the chamber 38 will increase simultaneously as the pressure in the chamber 21 increases.

As the pressure in the chamber 38 is thus increased, it acts in the direction of the left hand, as viewed in FIG. 1A, on the hydraulic brake-applying piston 30 to cause this piston 30, which abuts the brake head 15 that carries thereon the brake shoe 17, to transmit a braking force to the tread surface of the wheel 1 via the brake head 15 and shoe 17, it being understood that this force is in addition to the force transmitted thereto by the spring 32.

It is apparent from FIGS. 1A and 1B that the abovedescribed hydraulic brake application on the wheel 1 may be released by venting the pneumatic fluid under pressure from the chamber 23 (FIG. 1A) to atmosphere via the control valve device upon the return of this control valve device to its release position in which the pipe 42 is connected to atmosphere via this control valve device.

Now let it be supposed that, subsequent to effecting a hydraulic brake application on the wheel 1 in the manner described above and that, while this brake application is in effect, the braking force applied to the tread surface of the wheel 1 causes this wheel to decelerate at a rate that is in excess of a certain chosen rate which chosen rate is the maximum rate at which the wheel 1 may decelerate without slipping, or, in other words, the braking force exerted on the wheel 1 is such as to cause slipping of this wheel.

As explained in detail in the above-mentioned U.S. Pat. No. 3,912,034, when the wheel 1 begins to slip, a small degree of electric current is supplied to the brake relay driver amplifier 87 via the wire 88. This brake relay driver amplifier 87 operates in response to the small degree of electric current supplied thereto via the wire 88 to supply sufficient current to the coil of solenoid 82 of the magnet valve device 4 via wire 86 to cause this magnet valve device to operate to seat its valve 78 and unseat its valve 80.

Upon the seating of valve 78, communication between the chambers 73 and 76 is closed so that the passageway and pipe 74 are no longer open to atmosphere.

Upon the unseating of valve 80, a communication is established between chambers 77 and 73 whereupon pneumatic fluid under pressure will flow from the reservoir 5 to the chamber 57 in the hydraulic relief valve device 3 via pipe and passageway 81, chamber 77, past unseated valve 80, chamber 73, passageway and pipe 74 and passageway 75.

As pneumatic fluid under pressure is thus supplied to the chamber 57 below the piston 53, the fluid pressure force acting on the lower side of this piston will increase.

It is apparent from FIGS. 1A and 1B that the area of the piston 53 is substantially greater than the effective area of the diaphragm 24. Consequently, as pneumatic fluid under pressure is supplied from the reservoir 5 to the chamber 57 below the piston 53, the pressure in this chamber 57 will increase to establish a pneumatic fluid pressure force that acts in an upward direction on this piston 53. Therefore, when the value of this pneumatic fluid pressure force acting in an upward direction on the piston 57 exceeds the value of the sum of (1) the pneumatic fluid pressure force acting in the direction of the left hand, as viewed in FIG. 1A, on the effective area of the diaphragm 24 and (2) the force of the spring 55 less the value of the force of a spring 89 (FIG. 1A) acting on the packing cup 22, the piston 53, piston valve 49 and piston rod 48 will be shifted in an upward direction, as viewed in FIG. 1B, against the yielding resistance of the spring 55 and the compressible pneumatic fluid under pressure in the chamber 23 (FIG. 1A).

It will be noted that as the piston valve 49 is shifted upward, the ball valve 67, which is seated on its seat 66 by the spring 68, will prevent flow of hydraulic fluid from the chamber 71 the volume of which is decreasing to the chamber 70 the volume of which is increasing.

Accordingly, it is apparent that as the piston valve 49 is shifted upward by the increasing pneumatic fluid pressure in the chamber 57 and acting on the lower side of the large diameter piston 53, this piston valve 49 will force the substantially incompressible hydraulic fluid present in the chamber 55 to flow from this chamber and through the passageay and pipe 61, passageway 62, and chamber 21 (FIG. 1A) to the left-hand side of the packing cup 22 to cause this packing cup and the diaphragm 24 to be shifted in the direction of the left hand, it being noted that this shifting is effective to decrease the volume of the chamber 23 and thereby compress the compressible pneumatic fluid under pressure in this chamber.

Moreover, it is apparent from FIG. 1B that as the piston valve 49 is shifted upward it is effective to increase the volume of the chamber 70 which increase in volume tends to create a vacuum in this chamber 70. Accordingly, when the piston valve 49 is shifted upward to a position in which the periphery of this piston valve is above the location at which the passageway 63 opens at the wall surface of the counterbore 45, communication between the chamber 71 (FIG. 1B) in the hydraulic relief valve device 3 and the chamber 38 (FIG. 1A) is substantially closed, and this chamber 38 is connected to the chamber 70 (FIG. 1B) below the piston 49 via the passageway 64 and pipe and passageway 63.

It will be remembered, as stated aove, that as the piston valve 49 moves upward it tends to cause the creation of a vacuum in the chamber 70. Accordingly, it will be understood that when chamber 38 is placed in communication with the chamber 70 in which a partial vacuum exists, the pressure on the substantially incompressible hydraulic fluid in the chamber 38 is relieved and this hydraulic fluid can flow into the chamber 70.

Therefore, it is evident that when the pressure on the hydraulic fluid in the chamber 38 is thus relieved, the braking force passing the brake shoe 17 against the tread surface of the wheel 1 is correspondingly reduced to that provided by the spring 32, it being appreciated that this force provided by the spring 32 is only a small fraction of the braking force applied to this tread surface of the wheel 1 prior to the upward shifting of the piston 53 and piston valve 49 to substantially close communication between chamber 71 (FIG. 1B) and chamber 38 (FIG. 1A).

Due to the prompt and rapid reduction in the degree of the braking force pressing the brake shoe 17 against the tread surface of the slipping wheel 1, this wheel will promptly cease to decelerate at an abnormal or slipping rate and begin to accelerate back toward an angular velocity corresponding to the linear velocity or speed of the vehicle.

As a result of the change in the rotative condition of the slipping wheel 1 from deceleration to acceleration, the switch armature 22 of the relay 17 shown in FIG. 1 of the drawings in the hereinbefore-mentioned U.S. Pat. No. 3,912,034, operates to cause deenergization of the brake relay driver amplifier 87. This deenergization of the brake relay driver amplifier 87 in turn effects deenergization of the solenoid 82 of the magnet valve device 4.

When the solenoid 82 of the magnet valve device 4 is thus deenergized, the spring 83 is rendered effective to seat valve 80 and unseat valve 78 of this magnet valve device 4.

Upon the seating of the valve 80, the supply of pneumatic fluid under pressure from the reservoir 5 to the chamber 57 below the piston 53 of the hydraulic relief valve device 3 is cut off, and, upon the unseating of the valve 78, the pneumatic fluid under pressure present in the chamber 57 will flow to atmosphere via passageway 75, pipe and passageway 74, chamber 73, past unseated valve 78, chamber 76 and short passageway 79.

As pneumatic fluid under pressure is released from the chamber 57 below the piston 53 to atmosphere via the pathway described above, the spring 55 is rendered effective to shift the piston valve 49, piston 53 and piston rod 48 downward, as viewed in FIG. 1B, to the position shown.

It may be noted that as the piston valve 49 and piston 53 are shifted downward, the volume of the chamber 71 is increased whereupon the compressible pneumatic fluid under pressure in the chamber 23 (FIG. 1A) will expand to deflect the diaphragm 24 in the direction of the left hand to shift the packing cup 22 in this same direction. This shifting of the packing cup 22 in the direction of the left hand causes hydraulic fluid in the chamber 21 to flow to the chamber 71 (FIG. 1B) via the passageway 62 and pipe and passageway 61.

It will be further noted that as the piston valve 49 is shifted downward, the hydraulic fluid in the chamber 70, the volume of which chamber is decreasing, will unseat the ball valve 67 against the yielding resistance of the spring 68 and flow to the chamber 71.

When the piston 49 is shifted downward to the position shown in FIG. 1A, the chamber 71 is reconnected to the chamber 38 (FIG. 1A) via passageway and pipe 63 and passageway 64.

Consequently, when the piston valve 49 is returned to the position shown in FIG. 1B in which the chamber 71 is reconnected to the chamber 38, the pneumatic fluid under pressure in the chamber 23 and acting in the direction of the left hand on the effective area of the diaphragm 24 transmits a force to the packing cup 22 which in turn transmits a brake-applying force to the hydraulic brake-applying piston 30 via the substantially incompressible hydraulic fluid that now fills the chamber 21, passageway 62, pipe and passageway 61, chamber 71, passageway and pipe 63, passageway 64 and chamber 38.

The brake-applying force thus transmitted to the hydraulic brake-applying piston 30 is effective to increase the force pressing the brake shoe 17 against the tread surface of the wheel 1 until this force corresponds to the pressure of the pneumatic fluid under pressure present in the chamber 23 plus the force of the spring 32.

Should this reapplication of a braking force to the tread surface of the wheel 1 cause this wheel 1 to again decelerate at a rate that is in excess of the hereinbefore-mentioned certain chosen rate, the magnet valve device 4 and the hydraulic relief valve device 3 will again operate in the manner hreinbefore-described to reduce the degree of the brake-applying force pressing the brake shoe 17 against the tread surface of the wheel 1.

DESCRIPTON — FIG. 1A AND FIG. 2

FIG. 1A and FIG. 2, when taken together such that the right-hand edge of FIG. 1A is matched with the left-hand edge of FIG. 2, show a second embodiment of the invention wherein the hydraulic relief valve device 3 shown in FIG. 1B is replaced by a pneumatically-operated hydraulic relief valve device 90 shown in FIG. 2.

Referring to FIG. 2 of the drawings, it will be seen that the pneumatically-operated hydraulic relief valve device 90 comprises a sectionalized casing that has three casing sections 91, 92 and 93, a pressure head 94 and a bottom cover 95 secured together by any suitable means (not shown). The casing section 91 is provided with a bore 96 and a coaxial counterbore 97, and the casing section 92 is provided with a bore 98 that is coaxial with the bore 96 in the casing section 91. This bore 98 opens at its respective opposite ends into coaxial counterbores 99 and 100 that extend into this casing section 92 from the opposite ends thereof.

The wall surface of each of the bore 96 and 98 is provided with an annular groove in which is disposed an O-ring seal 101.

Prior to securing the three casing sections 91, 92 and 93, the pressure head 94 and bottom cover 94 together, a movable abutment, such as a piston 102 that has a pair of piston rods 103 and 104 integral therewith and extending in opposite directions from the opposite sides thereof, is slidably mounted in the counterbore 99 by first inserting the piston rod 104 through a heavy spring 105 and then into the bore 98 in the casing section 92 after which the piston 102 and spring 105 are pushed into the counterbore 99.

Adjacent its lower end, the piston rod 104 is provided wih an elongated slot 106 and a bottomed bore 107 that extends inward from the lower end of this piston rod.

Subsequent to pushing the piston 102 and spring 105 into the counterbore 99, this piston 102 is secured by any suitable means against ejection therefrom by the spring 105.

The length of the piston rod 104 is such that, with the piston 102 secured against ejection from the counterbore 99, the elongated slot 106 in piston rod 104 is disposed within the counterbore 100 in the casing section 92.

Therefore, a valve 108 having a stem 109 surrounded by a light spring 110 may now be secured by a lost-mostion connection to the piston rod 104 by inserting the stem 109 into the bottomed bore 107 and then inserting a pin 111, as by the application of a series of light hammer-like blows, into a bore 112 in the stem 109, with which bore 112 this pin 111 has a driving fit, until the opposite ends of this pin 111 are disposed in the elongated slot 106. It will be understood that the diameter of the pin 111 is such as to enable free movement of the stem 109 and valve 108 with respect to the piston rod 104 as the opposite ends of this pin 111 are shifted from one end to the other end of the elongated slot 106 after the valve 108 is moved downward into seating contact with a valve seat 113 provided therefor at the upper end of a first bore 114 that extends through the casing section 93 which abuts the lower end of the casing section 92 when all three of the casing sections 91, 92 and 93 are subsequently secured together.

Now, the means securing the piston 102 againt ejection from the counterbore 99 by the spring 105 may be removed, after which the piston rod 103 that extends upward from the upper side of the piston 102, as viewed in FIG. 2, may be inserted through the bore 96 in the casing section 91 and the O-ring seal 101 carried in the groove in the wall surface of this bore 96.

As shown in FIG. 2, the upper end of the piston rod 103 is provided with a threaded portion 115 of reduced diameter which thereby provides a shoulder 116. Consequently, a piston 117, the diameter of which is substantially greater than the diameter of the hereinbefore-mentioned piston 102, may now have its lower side placed in abutting relationship with the shoulder 116 after which a nut 118 is secured to the threaded portion 115 of the piston rod 103.

It will be noted from FIG. 2 that the casing sections 91 and 92 cooperate to form above the piston 102 a chamber 119 into which opens one end of a passageway 120 that extends through the casing section 92 and at its opposite end opens at the wall surface of the counterbore 100 intermediate the ends thereof. Also opening at the wall surface of the counterbore 100 diametrically opposite the opening of the passageway 120 is one end of a passageway 121 that extends through the casing section 92 and is connected by a correspondingly numbered pipe to one end of the passageway 64 (FIG. 1A) in the casing 43 of the brake unit 2.

It will be further noted from FIG. 2 that the casing section 92 is provided with a second bore 122 that extends therethrough and has a valve seat 123 formed at its lower end.

Moreover, it will be noted from FIG. 2 that the bottom cover 95 is provided with a first passageway 124 extending therethrough and at one end opening into the bore 114 in the casing section 93. The opposite end of this passageway 124 is connected by a correspondingly numbered pipe to the short passageway 62 (FIG. 1A) in casing 6 of the hydro-pneumatic brake unit 2, it being noted that this pip 124 corresponds to the pipe 61 in the first embodiment of the invention. This bottom cover 95 is also provided with a second passageway 125 that at one end opens into the passageway 124 intermediate the ends thereof and at its opposite end opens into the bottom of a bottomed bore 126 that extends inward from the upper side of the bottom cover 95. A light spring 127 interposed between the bottom of the bottomed bore 126 and a ball-type valve 128 normally biases this valve 128 into seating contact with the valve seat 123. The purpose of the ball-type valve 128 is to enable flow, in a manner hereinafter explained of hydraulic fluid under pressure from the interior of the counterbore 100 to the passageway and pipe 124 which is connected to the chamber 21 in the hydro-pneumatic master cylinder portion of the brake unit 2 shown in FIG. 1A of the drawings.

The piston 117, the periphery of which is provided with an annular groove in which is disposed an O-ring seal 129, cooperates with the upper end of the counterbore 97 in the casing section 91 and the pressure head 94 to form a chamber 130 above this piston 117 to which chamber pneumatic fluid under pressure may be supplied for effecting operation of the hydraulic relief valve device 90 in a manner hereinafter explained.

Pneumatic fluid under pressure may be supplied to the chamber 130 from a storage reservoir by operation of a magnet valve device in response to slipping of the wheel 1. Accordingly, the storage reservoir, the magnet valve device and the means for effecting energization of this magnet valve device may be identical to those shown for the first embodiment of the invention. Therefore, these elements and the components thereof shown in FIG. 2 of the drawings are denoted by the same reference numerals as are used for the corresponding elements and components shown in FIG. 1B.

OPERATION — FIG. 1A AND FIG. 2

Assume that the brake apparatus shown in FIG. 1A and FIG. 2, when the right-hand edge of FIG. 1A is matched with the left-hand edge of FIG. 2, is the apparatus on a vehicle to control the braking of the wheel 1 shown in FIG. 1A, it being understood that this apparatus constitutes the second embodiment of the present invention.

Accordingly, when it is desired to effect a brake application on the wheel 1, pneumatic fluid under pressure is admitted to the pressure chamber 23 (FIG. 1A) in the same manner as hereinbefore described for the first embodiment of the invention.

The pneumatic fluid under pressure thus supplied to the chamber 23 is effective, as in the first embodiment of the invention, to deflect the diaphragm 24 in the direction of the left hand and thereby, via the packing cup 22, cause an increase in the pressure of the hydraulic fluid in the chamber 21. As explained in connection with the first embodiment of the invention, the pressure of the hydraulic fluid in the chamber 38 will increase simultaneously as the pressure in the chamber 21 increases since chamber 21 is connected to chamber 38 via passageway 62, pipe and passageway 124, bore 114, past valve 108 which is held unseated from its seat 113 by the heavy spring 105, the interior of counterbore 100, passageway and pipe 121 and short passageway 64.

As the pressure in the chamber 38 is thus increased, it is effective on the brake applying piston 30 to transmit a hydraulic brake-applying force to the tread surface of the wheel 1, as in the first embodiment of the invention.

It will be noted from FIG. 2 of the drawings that hydraulic fluid under pressure may flow from the interior of the counterbore 100 to the chamber 119 above the piston 102 via passageway 120. However, the strength of the hereinbefore-mentioned heavy spring 105 is such as to prevent this piston 102 from being moved downward from the position shown by the pressure of the hydraulic fluid in the chamber 119.

As in the first embodiment of the invention, the abovedescribed hydraulic brake application on the wheel 1 may be released by venting the pneumatic fluid under pressure from the chamber 23 to atmosphere via the control valve device upon the return of this valve device to its release position.

Now let it be supposed that, while a hydraulic braking force is applied to the tread surface of the wheel 1, this wheel begins to decelerate at a rate that is in excess of the hereinbefore-mentioned certain chosen rate.

As explained in connection with the first embodiment of the invention, the magnet valve device 4 (FIG. 2) will now be operated in response to this rapid rate of deceleration of the wheel 1 to effect the supply of pneumatic fluid under pressure from the reservoir 5 to the chamber 130 above the piston 117, the diameter of which, as hereinbefore stated, is substantially greater than the diameter of the piston 102.

As pneumatic fluid under pressure is thus supplied to the chamber 130 above the piston 117, the pneumatic fluid pressure force acting downward on the piston 117 will increase. Therefore, when the sum of the value of the pneumatic fluid pressure force acting downward on the piston 117 and the value of the hydraulic fluid pressure force acting downward on to the piston 102, as the result of the hydraulic fluid under pressure supplied to the chamber 119 via the passageway 120, exceeds the value of the force of the heavy spring 105, the pistons 117 and 102, piston rods 103 and 104, spring 110, stem 109 and valve 108 will be moved in a downward direction, as viewed in FIG. 2, against the yielding resistance of the heavy spring 105 until the valve 108 is moved into seating contact with its seat 113 thus closing communication between chambers 21 and 38 (FIG. 1A).

It is apparent from FIG. 2 that as the piston 102 is shifted downward, it is effective to increase the volume of the chamber 119 which increase in volume tends to create a vacuum in this chamber 119 since the valve 108 is seated on its seat 113 to close communication between chambers 21 and 119.

Moreover, it is apparent from FIG. 2 that, subsequent to the seating of the valve 108 on its seat 113, the pistons 117 and 102, and piston rods 103 and 104 may continue to be moved downward against the combined yielding resistance of the heavy spring 105 and the light spring 110 to further increase the volume of the chamber 119 above the piston 102 until the combined forces of these springs 105 and 110 are equal in magnitude and opposite in direction to the pneumatic fluid pressure force acting downward on the piston 117.

From the foregoing, it is apparent that as the volume of the chamber 119 is increased and a partial vacuum created in this chamber by the downward shifting of the piston 102, the pressure on the substantially imcompressible hydraulic fluid in the chamber 38 (FIG. 1A) is relieved since this chamber 38 is in communication with the chamber 119 via the passageway 64, pipe and passageway 121, interior of counterbore 100 and passageway 120.

Accordingly, it will be understood that when the pressure on the hydraulic fluid in the chamber 38 is thus relieved, the braking force pressing the brake shoe 17 against the tread surface of the wheel 1 is correspondingly reduced to that provided by the spring 32, as in the first embodiment of the invention.

The wheel 1 will now promptly cease to decelerate at an abnormal or slipping rate and begin to accelerate back toward an angular velocity corresponding to the linear velocity of the vehicle.

As a result of the change in the rotative condition of the slipping wheel 1 from deceleration to acceleration, the magnet valve device 4 will be operated in the same manner as hereinbefore described for the first embodiment of the invention to effect a release of the pneumatic fluid under pressure in the chamber 130 to atmosphere.

As the pneumatic fluid under pressure is thus released from the chamber 130, the heavy spring 105 is rendered effective to shift the pistons 102 and 117 together with the piston rods 103 and 104 in a upward direction.

As the piston 102 is thus initially shifted upward by the heavy spring 105, prior to the piston rod 104 moving upward far enough for the lower end of the elongated slot 106 therein to contact the opposite ends of the pin 111 and thereafter lift the valve 108 from its seat 113 to reestablish communication between chamber 21 and chamber 38, this upward shifting of the piston 102 will force the incompressible hydraulic fluid to flow from the chamber 119 above this piston 102 to the chamber 38 via the passageway 120, the interior of the counterbore 100, passageway and pipe 121 and passageway 64 to increase the pressure of the hydraulic fluid in the chamber 38 to thereby reapply a braking force to the tread surface of the wheel 1, it being apparent that the degree of this braking force corresponds to the strength of the heavy spring 105.

As the pistons 102 and 117 and the piston rods 103 and 104 are further shifted in an upward direction, subsequent to the lower end of the elongated slot 106 contacting the opposite ends of the pin 111, the valve stem 109 and valve 108 will be shifted in an upward direction so that the valve 108 is unseated from its seat 113.

When the valve 108 is thus unseated from its seat 113, communication with reestablished between chambers 21 and 38. Therefore, the pneumatic fluid under pressure present in the chamber 23 will now be rendered effective, via the packing cup 22 and the substantially incompressible hydraulic fluid in the chamber 21, passageway 62, pipe and passageway 124, bore 114, past now unseated valve 108, the interior of counterbore 100, passageway and pipe 121, passageway 64 and chamber 38 to further increase the degree of the braking force pressing the brake shoe 17 against the tread surface of the wheel 1 until this braking force is in accordance with the degree of the pneumatic fluid pressure in the chamber 23 and the force of the spring 32.

Should this reapplication of a braking force to the tread surface of the wheel 1 cause this wheel to again slip, the magnet valve device 4 and the hydraulic release valve device 90 will again operate in the manner described above to reduce the degree of the force pressing the brake shoe 17 against the tread surface of this wheel.

DESCRIPTION — FIG. 1A AND FIG. 3

FIG. 1A and FIG. 3, when taken together such that the right hand edge of FIG. 1A is matched with the left-hand edge of FIG. 3, show a third embodiment of the invention wherein the pneumatically-operated hydraulic relief valve device 90 shown in FIG. 2 is replaced by a solenoid-operated hydraulic relief valve device 131 shown in FIG. 3.

In FIG. 3 of the drawings, there is shown in cross-section the hydraulic relief valve device 131 that is provided with a solenoid 132 to operate it. The solenoid-operated hydraulic relief valve device 131 differs from the pneumatically-operated hydraulic relief valve device 90 shown in FIG. 2 in that the pneumatically-operated piston 117, piston rod 103, casing section 91 and pressure head 94 are omitted and replaced by the solenoid 32 that is secured by any suitable means (not shown) to the upper end of the casing section 92, as shown in FIG. 3.

It will be understood that the remainder of the hydraulic relief valve device 131 is identical in construction to the hydraulic relief valve device 90 shown in FIG. 2. Accordingly, like reference numerals have been used to designate the structure shown in FIG. 3 which is identical to that shown in FIG. 2. Only such features of the structure and operation of the third embodiment of the invention shown in FIG. 1A and FIG. 3 which differ from that of the second embodiment shown in FIG. 1A and FIG. 2 will be hereinafter described.

It will be noted from FIG. 3 that the solenoid 132 comprises a coil 133 for operating a plunger 134 that extends through an O-ring seal 135 that is disposed in an annular groove provided in the wall surface of a bore 136 in a body 137 of this solenoid 132.

Moreover, as can be seen from FIG. 3, the lower end of the body 137 abuts the upper end of the casing section 92, and the lower end of the plunger 134 abuts the upper side of the piston 102.

Furthermore, as shown in FIG. 3, one end of the coil 133 is connected by a wire 138 to ground indicated by the reference numeral 139. The other end of this coil 133 is connected by a wire 140 to the brake relay driver amplifier 87. As in the other embodiments of the invention, this brake relay driver amplifier 87 in turn is connected by the wire 88 to the one terminal of the switch armature of a relay in any suitable device that is operatively responsive to a chosen rate of deceleration of the wheel 1 of the vehicle.

OPERATION — FIG. 1A AND FIG. 3

Assume that the brake apparatus shown in FIG. 1A and FIG. 3, when the right-hand edge of FIG. 1A is matched with the left-hand edge of FIG. 3, is the apparatus on a vehicle to control the braking of the wheel 1 shown in FIG. 1A, it being understood that this apparatus constitutes the third embodiment of the present invention.

A brake application may be effected and subsequently released on the wheel 1 in the same manner as hereinbefore-described for the second embodiment of the invention and therefore, need not be repeated.

Considering the apparatus shown in FIG. 1A and FIG. 3, let it be supposed that while a hydraulic braking force is applied to the tread surface of the wheel 1, this wheel begins to decelerate at a rate that is in excess of the hereinbefore-mentioned certain chosen rate.

As explained in connection with the first embodiment of the invention, when the wheel 1 begins to slip, a small degree of electric current is supplied to the brake relay driver amplifier 87 via the wire 88. This brake relay driver amplifier 87 operates in response to the small degree of electric current supplied thereto via the wire 88 to supply sufficient current to the coil 133 of solenoid 132 to cause this coil to transmit an electromagnetic force to the plunger 134. This plunger 134 in turn transmits a force to the piston 102 which force acts in a downward direction, as viewed in FIG. 3. Therefore, when the sum of the value of the force transmitted to the piston 102 by the plunger 134 and the value of the hydraulic fluid pressure force acting downward on this piston 102, as the result of the hydraulic fluid under pressure supplied to the chamber 119 via the passageway 120, as in the second embodiment of the invention, exceeds the value of the force of the heavy spring 105, the plunger 134, piston 102, piston rod 104, spring 110, stem 109 and valve 108 will be moved in a downward direction against the yielding resistance of the heavy spring 105 until the valve 108 is seated on its seat 113 to close communication between chambers 21 and 38 (FIG. 1A).

As is apparent from FIG. 3, this downward shifting of the piston 102 is effective to increase the volume of the chamber 119 which increase in volume tends to create a vacuum in this chamber 119 since valve 108 now closes communication between chambers 21 and 38, as stated above.

As in the second embodiment of the invention, subsequent to the seating of the valve 108 on its seat 113, the plunger 134, piston 102 and piston rod 104 may continue to be moved downward against the combined yielding resistance of the heavy spring 105 and the light spring 110 to further increase the volume of chamber 119 above piston 102 until the combined forces of these springs 105 and 110 are equal in magnitude and opposite in direction to the value of the force transmitted by the plunger 134 to the piston 102 and acting downward on this piston 102.

As in the second embodiment of the invention, the downward movement of the piston 102 increases the volume of and degree of vacuum in the chamber 119 above this piston. Accordingly, as the volume of and degree of vacuum in the chamber 119 is increased, the pressure on the hydraulic fluid in the chamber 38 (FIG. 1A) is relieved, thereby correspondingly reducing the braking force pressing the brake shoe 17 against the tread surface of the wheel 1 to that provided by the spring 32 as in the previous embodiments of the invention.

Therefore, the wheel 1 will now promptly cease to decelerate at an abnormal or slipping rate and begin to accelerate back toward an angular velocity corresponding to the linear velocity of the vehicle.

As a result of the change in the rotative condition of the slipping wheel 1 from deceleration to acceleration, the solenoid 132 (FIG. 3) will be deenergized in the same manner as hereinbefore explained for the solenoid 82 (FIG. 1B).

Upon deenergization of the solenoid 132, the heavy spring 105 is rendered effective to shift the plunger 134, piston 102, piston rod 104, spring 110, stem 109 and valve 108 upward to the position shown to thereby reconnect the chambers 21 and 38 whereupon a hydraulic braking force will be reapplied to the tread surface of the wheel 1.

Should this reapplication of a braking force to the tread surface of this wheel 1 cause this wheel to again slip, the solenoid-operated hydraulic relief valve device 131 will again operate in the manner described above to reduce the degree of the brake-applying force pressing the brake shoe 17 against the tread surface of the wheel 1.

Considering the first embodiment of the invention, if a brake release is effected by venting the pneumatic fluid under pressure from the chamber 32 (FIG. 1A) to atmosphere while the wheel 1 is slipping and the piston valve 49 is in a position in which its periphery is in contact with the wall surface of the counterbore 45 above the location at which the passageway 63 opens at this wall surface, the ball valve 67 will unseat from its seat 66 to enable flow of hydraulic fluid from the chambers 38 and 70 to the chamber 21 as the spring 89 moves the packing cup 22 in the direction of the right-hand to the position shown in FIG. 1A thereby increasing the volume of the chamber 21.

Likewise, considering the second and third embodiments of the invention, if a brake release is effected by venting the pneumatic fluid under pressure in the chamber 23 (FIG. 1A) to atmosphere while the wheel 1 is slipping and the valve 108 shown in FIGS. 2 and 3 is seated on its seat 113, the ball valve 128 (FIGS. 2 and 3) will unseat from its seat 123 to enable flow of hydraulic fluid from the chamber 38 (FIG. 1A) to the chamber 21 via passageway 64, pipe and passageway 121 (FIGS. 2 and 3), interior of counterbore 100, bore 122, past ball valve 128 which is unseated from its seat 123 against the yielding resistance of the spring 127, bottomed bore 126 passageway 125, passageway and pipe 124 and passageway 62 (FIG. 1A) as the spring 89 moves the packing cup 22 in the direction of the right hand to the position shown in FIG. 1A thereby increasing the volume of chamber 21.

Having now described the invention what I claim as new and desire to secure by Letters Patent is:

1. A wheel-slip-responsive power-actuated brake-applying-force relief valve device for interposition in a conduit extending between a master cylinder operable to supply therefrom a fluid under pressure and a brake-applying cylinder that is provided with a piston operable by fluid under pressure supplied thereto from the master cylinder via the conduit to apply a braking force to a vehicle wheel, said relief valve device comprising:
   a. a sectionalized casing having therein a plurality of chambers, one pair of said chambers being connected by the conduit respectively to the master cylinder and the brake applying cylinder,
   b. valve means operable from a first position in which a communication between said one pair of chambers is open to a second position in which said communication is closed to trap fluid under pressure acting on the piston of the brake-applying cylinder,
   c. movable abutment means operatively connected to said valve means for effecting operation thereof and cooperative with said sectionalized casing to form one of said pair of chambers, said one chamber being variable in volume in response to shifting of said abutment means, this increase in volume, subsequent to said valve means closing said communication to trap said fluid under pressure, tending to produce a vacuum in said one chamber whereby, by reason of communication between said one chamber and said trapped fluid, the pressure of said trapped fluid is relieved, thereby affecting a reduction of the fluid pressure brake-applying force acting on the piston of the brake-applying cylinder,
   d. biasing means so disposed as to be normally effective to cause said abutment means to reduce the volume of said one chamber to a minimum, and
   e. means operatively responsive to slipping of the vehicle wheel to transmit a force to said abutment means tht is in excess of the force transmitted to said abutment means by said biasing means thereby to effect shifting of said abutment means against the yielding resistance of said biasing means to operate said valve means to close said communication between said one pair of chambers, said shifting of said abutment means being effective to increase the volume of said one chamber thereby effecting a reduction of the fluid pressure brake-applying force on the piston of the brake-applying cylinder.

2. A wheel-slip-responsive power-actuated brake-applying-force relief valve device, as recited in claim 1, further characterized in that said sectionalized casing is provided with two coaxial counterbores connected by a coaxial bore, and said movable abutment means comprises a pair of pistons one of which is slidably mounted in one of said counterbores.

3. A wheel-slip-responsive power-actuated brake-applying-force relief valve device, as recited in claim 1, further characterized in that the strength of said biasing means and the effective area of said abutment means are so related that the subjection of said effective area of said abutment means to the fluid under pressure supplied from the master cylinder to the piston of the brake-applying cylinder is ineffective to move said abutment means against the resistance of said biasing means.

4. A wheel-slip-responsive power-actuated brake-applying-force relief valve device, as recited in claim 1, further characterized in that said movable abutment means comprises a pair of movable abutments, and said means operatively responsive to slipping of the vehicle wheel comprises:
   a. one of said pair of movable abutments which is supplied with fluid under pressure upon the occurrence of wheel slip to cause the establishment of a fluid pressure force thereon, and
   b. means enabling said one movable abutment to transmit said fluid pressure force to said valve means to cause operation of said valve means from its said first position to its said second position.

5. A wheel-slip-responsive power-actuated brake-applying-force relief valve device, as recited in claim 1, further characterized in that said means operatively responsive to slipping of the vehicle wheel comprises:
   a. a solenoid, and
   b. circuit means for effecting energization of said solenoid in response to slipping of the vehicle wheel at a rate in excess of a chosen rate.

6. A wheel-slip-responsive power-actuated brake-applying-force relief valve device, as recited in claim 1, further characterized in that said sectionalized casing is provided wih two coaxial counterbores connected by a coaxial bore, and said valve means comprising a piston valve slidably mounted in one of said counterbores and cooperating with the wall surface thereof to form on the respective opposite sides of said piston valve said pair of chambers.

7. A wheel-slip-responsive power-actuated brake-applying-force relief valve device, as recited in claim 1, further characterized in that said sectionalized casing comprises a plurality of casing sections one of which is provided with two coaxial counterbores connected by a coaxial bore, and said movable abutment means is a piston that is slidably mounted in one of said counterbores and has a piston rod extending through said bore and operatively connected to said valve means disposed in the other counterbore.

8. A wheel-slip-responsive power-actuated brake-applying-force relief valve device, as recited in claim 1, further characterized in that said valve means comprises:
   a. a valve seat formed on said sectionalized casing,
   b. a valve seat movable into seating contact with said seat to close said communication between said pair of chambers, and
   c. a lost-motion connection connecting said valve to said movable abutment means to enable shifting of said abutment means subsequent to seating of said valve on said seat to further increase the volume of said one chamber.

9. A wheel-slip-responsive power-actuated brake-applying-force relief valve device, as recited in claim 1, further characterized in that said valve means includes a one-way flow valve means for providing flow of fluid under pressure from one of said pair of chambers to the other of said pair of chambers upon operation of said valve means by said abutment means from said second position of said valve means to said first position of said valve means.

10. A wheel-slip-responsive power-actuated brake-applying-force relief valve device, as recited in claim 1, further characterized by a one-way flow valve means separate from said valve means for providing flow of fluid under pressure from one of said pair of chambers to the other of said pair of chambers subsequent to operation of said valve means by said abutment means from its said first position to its said second position.

11. A wheel-slip-responsive power-actuated brake-applying-force relief valve device, as recited in claim 6, further characterized by a one-way flow valve means carried by said piston valve for providing flow of fluid under pressure from one of said pair of chambers to the other of said pair of chambers.

12. A wheel-slip-responsive power-actuated brake-applying-force relief valve device, as recited in claim 8, further characterized in that said lost-motion connection connecting said valve to said movable abutment means comprises:
   a. a rod member secured at one end to said movable abutment means and having a bottomed bore extending inward from its opposite end, said rod member being provided intermediate its ends with an elongated slot opening into said bottomed bore,
   b. a stem secured at one end to said valve and having intermediate its ends a bore the axis of which forms a right angle with the axis of said stem, and
   c. a pin of such length and diameter as to extend through said bore in said stem and have its respective opposite ends slidably disposed in said elongated slot in said rod member to enable shifting of said movable abutment means and said rod member relative to said stem and valve subsequent to seating of said valve on its seat.

13. Apparatus for controlling the slipping condition of a wheel of a vehicle of the type having a brake-applying cylinder that is provided with a piston operable by a hydraulic fluid pressure acting thereon and a differential-type abutment means having at least two unequal opposing areas connected to said brake-applying cylinder by a conduit through which hydraulic fluid under pressure is supplied from the smaller of said unequal opposing areas upon the supply of a pneumatic or hydraulic fluid under pressure to the larger of said areas, wherein the improvement comprises:
   a. a wheel-slip brake-applying-force relief valve device interposed in said conduit and comprising:
      i. a sectionalized casing having therein a pair of chambers that are connected by the conduit respectively to the smaller of said unequal opposing areas and the brake-applying cylinder, ii. valve means operable from a first position in which a communication between said pair of chambers is open to a second position in which said communication is closed, iii. a first movable abutment operatively connected to said valve means for effecting operation thereof and cooperative with said sectionalized casing to form on one side of said abutment a chamber the volume of which is variable in accordance with the shifting of said abutment relative to said casing, the increase in the volume of said chamber, subsequent to said valve means closing said communication, being effective to relieve the pressure on the hydraulic fluid supplied to the piston of the brake-applying cylinder prior to the closing of said communication, iv. biasing means disposed on the other side of said first abutment and of such strength as to be normally effective to reduce the volume of said chamber to a minimum notwithstanding said first abutment being subject to hydraulic fluid under pressure supplied from the smaller of said unequal opposing areas to the piston of the brake-applying cylinder, and v. force-transmitting means for transmitting a force to said one side of said first abutment that is in excess of the force transmitted to said other side by said biasing means for effecting shifting of said first abutment against the yielding resistance of said biasing meas to operate said valve means to close said communication between said pair of chambers, said shifting of said abutment being effective to increase the volume of said chamber on said one side of said abutment thereby relieving the pressure on the hydraulic fluid supplied to the piston of the brake-applying cylinder prior to said valve means closing said communication, and b. means operative in response to the slipping condition of the wheel to cause said force-transmitting means to transmit a fluid pressure force to said one side of said first abutment.

14. Apparatus for controlling the slipping condition of a wheel, as recited in claim 13, further characterized in that said force-transmitting means comprises:

a. a movable abutment, and b. a rod member operatively connecting one side of said abutment of said force-transmitting means and said first abutment.

15. Apparatus for controlling the slipping condition of a wheel, as recited in claim 13, further characterized in that said force-transmitting means comprises:

a. a solenoid comprising:

i. a coil, ii. a plunger disposed in abutting relation with said one side of said first abutment for transmitting a force to said first abutment upon energization of said coil, and iii. power supply means for said coil to effect the supply of energy to said coil upon operation of said wheel slip responsive means.

16. Apparatus for controlling the slipping condition of a wheel, as recited in claim 14, further characterized in that said means operative in response to the slipping condition of the wheel to cause said force-transmitting means to transmit a force to said one side of said first abutment comprises:

a. a storage reservoir normally charged with fluid under pressure, b. a magnet valve device operative when energized to effect the supply of fluid under pressure from said storage reservoir to the other side of said movable abutment of said force-transmitting means and operative when deenergized to release fluid under pressure from said other side to atmosphere, and c. power supply means for said magnet valve device to effect the supply of energy to said valve device upon operation of said wheel slip responsive means.

17. A wheel-slip-responsive power-actuated brake-applying-force relief valve device, as recited in claim 14, further characterized in that the effective area of said movable abutment of said force-transmitting means exceeds the effective area of the larger of said two unequal opposing areas of said differential-type abutment means whereby, while said effective area of said larger of said two unequal opposing areas is subject to a pneumatic fluid under pressure at the time said movable abutment of said force-transmitting means transmits said fluid pressure force to said one side of said first abutment, the volume of said pneumatic fluid under pressure acting on said effective area of said larger of said two unequal opposing areas is reduced.

18. Apparatus for controlling the slipping condition of a wheel, as recited in claim 15, further characterized in that said power supply means operative in response to a slipping condition of the wheel comprises:

a. a brake relay driver amplifier for energizing said coil of said solenoid when activated, b. a contact closed in response to a slipping condition of the wheel, and c. a circuit including said wheel slip contact for activating said brake relay driver amplifier.

19. Apparatus for controlling the slipping condition of a wheel, as recited in claim 16, further characterized in that said power supply means operative in response to a slipping condition of the wheel comprises:

a. a brake relay driver amplifier for energizing said magnet valve device when activated, b. a contact closed in response to a slipping condition of the wheel, and c. a circuit including said wheel slip contact for activating said brake relay driver amplifier.

* * * * *

UNITED STATES PATENT AND TRADEMARK OFFICE
CERTIFICATE OF CORRECTION

PATENT NO. : 3,985,397
DATED : October 12, 1976
INVENTOR(S) : John G. Cannon

It is certified that error appears in the above—identified patent and that said Letters Patent are hereby corrected as shown below:

Column 16, line 61, "tht" should be --that--

Column 18, line 1, after "valve" delete "seat"

Signed and Sealed this

Nineteenth Day of April 1977

[SEAL]

Attest:

RUTH C. MASON
*Attesting Officer*

C. MARSHALL DANN
*Commissioner of Patents and Trademarks*